United States Patent [19]

Zutt et al.

[11] Patent Number: 5,522,426
[45] Date of Patent: Jun. 4, 1996

[54] VALVE ARRANGEMENT IN PARTICULAR A SOLENOID VALVE ARRANGEMENT FOR SLIP-CONTROLLED AUTOMOTIVE VEHICLE BRAKE SYSTEMS

[75] Inventors: Ulrich Zutt, Niedernhausen; Helmut Weisbrod, Bad-Nauheim; Kurt Wollsiffer, Heiligenmoschel; Dalibor Zaviska, Eschborn/Ts; Peter Volz, Darmstadt, all of Germany

[73] Assignee: ITT Automotive Europe GmbH, Germany

[21] Appl. No.: 403,730

[22] PCT Filed: Sep. 9, 1983

[86] PCT No.: PCT/EP93/02437

§ 371 Date: Mar. 13, 1995

§ 102(e) Date: Mar. 13, 1995

[87] PCT Pub. No.: WO94/07067

PCT Pub. Date: Mar. 31, 1994

[30] Foreign Application Priority Data

Sep. 11, 1992 [DE] Germany ........................ 42 30 393.1
Mar. 30, 1993 [DE] Germany ........................ 43 10 265.4

[51] Int. Cl.⁶ ................................................. B60T 8/00
[52] U.S. Cl. ................... 137/599; 137/533.13; 251/367
[58] Field of Search ........................... 137/533, 533.11, 137/533.13, 533.15, 533.17, 599, 884, 599.1; 251/367, 129.01

[56] References Cited

U.S. PATENT DOCUMENTS

| | | | |
|---|---|---|---|
| 2,210,559 | 8/1940 | Albright | 137/599 X |
| 2,319,604 | 5/1943 | Hennessy | 137/533.11 X |
| 3,077,899 | 2/1963 | Waibel | 251/367 X |
| 3,078,872 | 2/1963 | Algino | 251/367 X |
| 3,315,693 | 4/1967 | Braun | 137/533.11 |
| 3,392,751 | 7/1968 | Pommersheim et al. | 137/599 X |
| 3,658,091 | 4/1972 | Buzzi | 137/533.11 X |
| 4,640,558 | 2/1987 | Nomura et al. | |
| 4,832,075 | 5/1989 | Dubach | 137/533.11 X |
| 4,860,794 | 8/1989 | Parrott et al. | |
| 4,938,545 | 7/1990 | Shuey et al. | |
| 5,137,339 | 8/1992 | Brown | |

FOREIGN PATENT DOCUMENTS

| | | |
|---|---|---|
| 0051800 | 5/1982 | European Pat. Off. . |
| 0256272 | 2/1988 | European Pat. Off. . |
| 7402510 | of 0000 | Germany . |
| 2452094 | 5/1976 | Germany . |
| 2657197 | 6/1978 | Germany . |
| 2801689 | 7/1979 | Germany . |
| 3233268 | 3/1984 | Germany . |
| 3525523 | 7/1985 | Germany . |
| 3443520 | 6/1986 | Germany . |
| 3520352 | 12/1986 | Germany . |
| 3622388 | 1/1987 | Germany . |
| 3641922 | 6/1987 | Germany . |
| 3607693 | 9/1987 | Germany . |
| 4013425 | 6/1991 | Germany . |
| 4035817 | 5/1992 | Germany . |
| 9016775 U | 5/1992 | Germany . |
| 4108028 | 9/1992 | Germany . |
| 4132471 | 4/1993 | Germany . |

*Primary Examiner*—Stephen M. Hepperle
*Attorney, Agent, or Firm*—Dykema Gossett

[57] ABSTRACT

A valve arrangement, particularly to a solenoid valve arrangement for slip-controlled automotive vehicle brake systems, with a first valve closure member, in particular a hydraulically actuatable non-return valve, and a second valve closure member, preferably electromagnetically controllable by means of an armature and a magnet coil and arranged in a valve accommodating bore of the valve housing accommodating the valve arrangement, with both valve closure members being operable independently of each other in terms of action and being jointly arranged in the valve accommodating bore of the further valve closure member. This ensures a compact and easy manufacture of the valve arrangement.

8 Claims, 2 Drawing Sheets

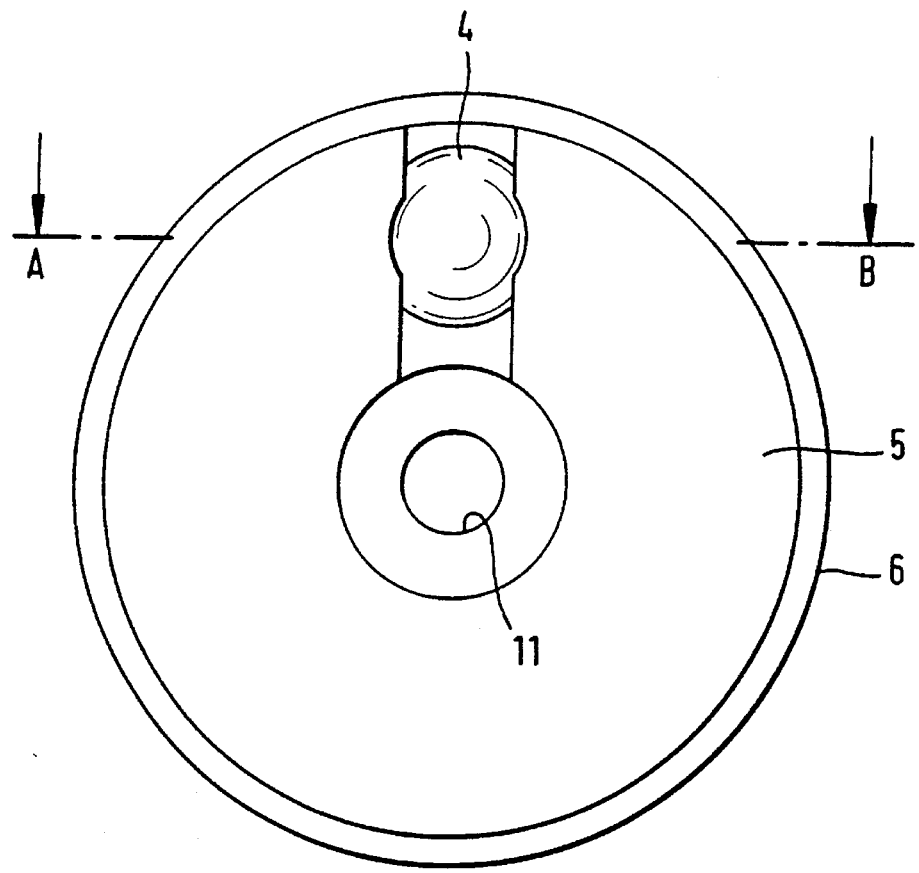
Fig.1
Fig.2
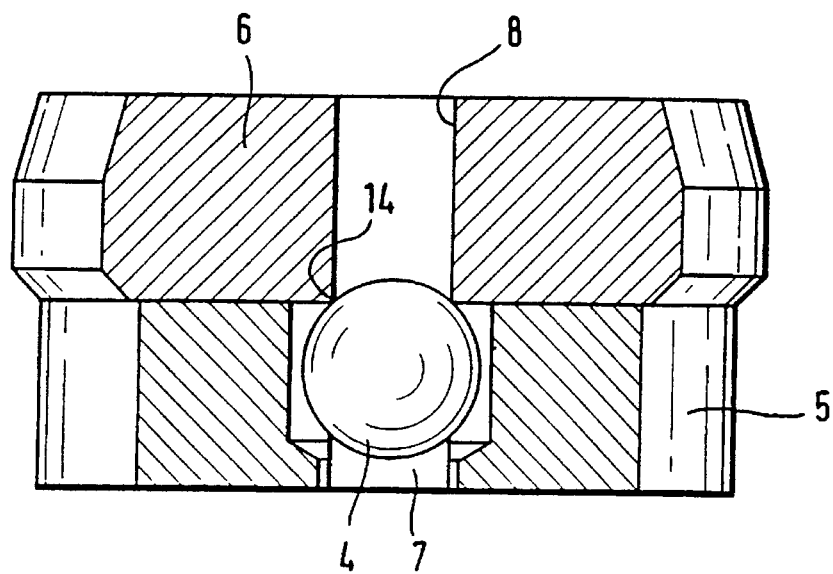

VALVE ARRANGEMENT IN PARTICULAR A SOLENOID VALVE ARRANGEMENT FOR SLIP-CONTROLLED AUTOMOTIVE VEHICLE BRAKE SYSTEMS

TECHNICAL FIELD

This invention relates to a valve arrangement, in particular to a solenoid valve arrangement for slip-controlled automotive vehicle brake systems.

BACKGROUND OF THE INVENTION

From DE-A-41 35 232 a valve arrangement of this general type is known. By means of a parallel connection of a ball-type non-return valve relative to a further electromagnetically actuatable valve closure member, this valve arrangement will establish a direct pressure medium communication between a pressure medium channel connected to the pressure medium consumer and a further pressure medium channel connected to the pressure medium source as soon as the hydraulic opening pressure of the non-return valve exceeds the closing pressure. Both valve closure members are separate from each other in terms of location so that there result disadvantages with regard to design and assembly.

From DE-A-32 33 268 a hydraulic valve has become known which is inserted with a valve cartridge into a valve housing. The valve cartridge consists of a sleeve caulked on a drain component and is inserted as a pre-assembled multi-part cartridge into the valve housing. Between the valve cartridge and the valve housing, there is a sieve lining with a pressure torque which presses a valve ball against the valve seat of the end part. The valve ball is thus only held in connection with the sieve lining. A second valve ball abuts on the opposite front surface of the end part. The suggested design is disadvantageous in that the end part acting as valve accommodating body can exclusively be held in the valve housing as a unit caulked with the sleeve. Because of the holding function for the spring tongue, the caulking edge between the sleeve and the end part is automatically arranged below the end part so that fixing of the valve accommodating body in the valve housing will only come about by using a sleeve that has been pre-mounted to the valve accommodating body. Thus the valve cartridge construction designed for two valve closure members does not permit any direct fastening of the valve accommodating body in the valve housing. Not only does this design result in an assembly having numerous components but also results in an assembly which is bulky.

It is thus an object of this invention to provide a valve arrangement of as compact a construction as possible which enables a simple and safe assembly and positioning of the valve closure members and which also favorably manages the fluid flow therethrough.

According to this invention, this object is solved by the characteristics of claims 1 and 8 whereby the necessity of using holding components for positioning the valve closure members and the valve accommodating body is rendered superfluous.

The measures disclosed in the sublaims provide expedient embodiments of this invention which will be illustrated in more detail and will be explained in the following in the context of the further characteristics and advantages of this invention, reference being made to a plurality of drawings.

BRIEF DESCRIPTION OF THE DRAWINGS

FIG. 1 is a top view of the valve accommodating body provided with the first valve closure member.

FIG. 2 is a cross-section of the valve arrangement along section line A–B as per FIG. 1.

DETAILED DESCRIPTION OF THE PREFERRED EMBODIMENTS

Figure 3:
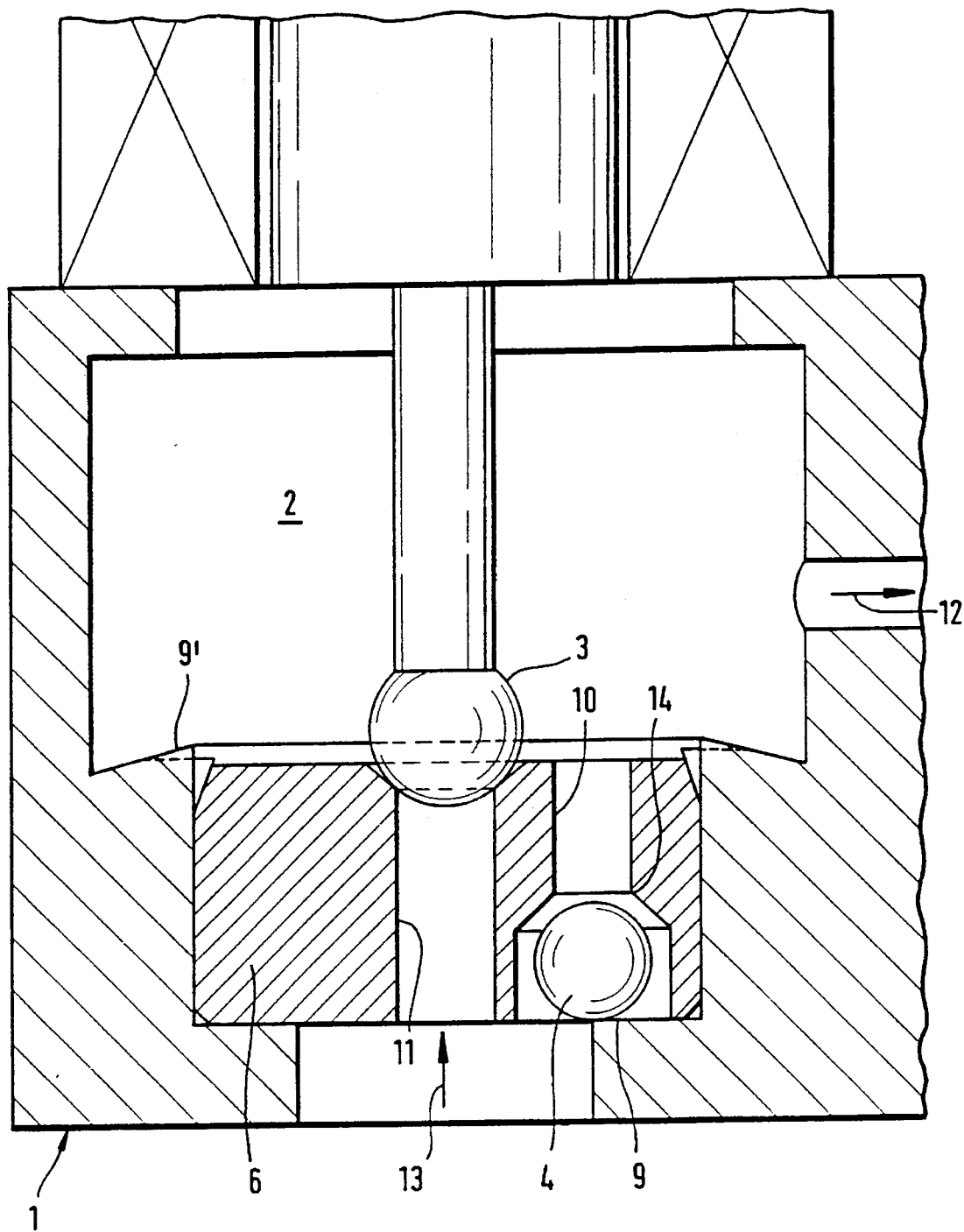
FIG. 3 is an alternative embodiment with regard to the arrangement of the first valve closure member in the valve accommodating body of the further valve closure member.

FIG. 1 shows the first valve closure member 4, arranged eccentrically in the valve accommodating body 5, and the central pressure medium passage 11 for the second valve closure member 3. The construction of the first valve closure member 4 acting as a non-return valve is that of a ball valve. The valve accommodating body 5 is a disk-like valve plate adapted to the valve accommodating bore of the valve housing (cf. FIG. 3).

FIG. 2 shows a cross-section performed in the plane of the first valve closure member 4, which plane is discernible in FIG. 1. The first and also the second valve accommodating body 5, 6 are arranged so as to cover each other so that the pressure medium passages 7, 8 of the two valve accommodating bodies 5, 6 are aligned coaxially with respect to each other.

The valve seat 14 guides and the valve closure member 4 are designed as a ball-type non-return valve. The valve seat results from the different inside widths of the two superimposed pressure medium passages 7, 8 at the contact surfaces. Therefore, all that is needed with regard to the expanded bore accommodating the ball valve is a caulking at the bore opening averted from the valve seat 14 or, alternatively, a correspondingly tapering bore of the pressure medium passage 7 in order to protect the valve closure member 4 against falling out. In a plane offset with regard to the section plane, there is the further valve closure member 3 which comes to abut the bore situated within the valve accommodating body 6 in a rotationally symmetrical manner (cf. FIG. 1).

FIG. 3 shows an alternative advantageous embodiment of the inventive idea according to which both valve closure members 3, 4 are guided in one valve accommodating body 6. The first valve closure member 4 designed as a ball-type non-return valve is arranged within a stepped bore 10 which is coplanar to the axis of symmetry of the valve accommodating body 6. The transition of the stepped bore 10 is designed as a valve seat 14 and has the shape of the frustrum of a cone. The expanded channel port at the frustrum of the cone forms the pressure medium passage accommodating the ball-type non-return valve and leading to the pressure medium source 13 such as the braking pressure generator whereas the tapering channel port establishes the pressure medium passage to the pressure medium consumer 12 such as the wheel brake. The hydraulic passage cross-section of the bore step 9 facing the pressure medium source 13 in the valve accommodating bore 2 is rated so that pressure medium can pass unhindered from the pressure medium pressure source 13 into the pressure medium passage accommodating the ball-type non-return valve. The ball-type non-return valve is prevented from falling out in that the bore step 9 sufficiently overlaps the ball. The bore step 9 takes over the function of a valve stop. A further bore step 9' provided in the valve housing 1 and facing the pressure medium consumer 12 forms an enlarged opening cross-section in order to enable the insertion of the valve accommodating body 6 into the valve accommodating bore 2. This bore step 9' is exemplarily designed as a caulking spot at the edge of the valve accommodating body 6. In a centrally situated passage bore 11, the valve accommodating body 6 accommodates the further, preferably electromagnetically operable valve closure member 3. For the purpose of centering and sealing the passage bore 11 the same is expanded in a conical manner towards the valve closure member 3 so that, in the closing position of the valve closure member 3, pressure medium communication can be established between the pressure medium source 13 and the pressure medium consumer 12 only by way of the ball-type non-return valve towards the pressure medium source 13 and, thus, for the purpose of pressure relief of the pressure medium consumer 12.

We claim:

1. A solenoid valve arrangement for a slip-controlled automotive vehicle brake system, comprising:

a valve housing, said valve housing having a valve accommodating bore with a lower step and an upper step, first and second valve closure members, said valve closure members arranged in said valve accommodating bore and operational independently of each other;

a valve accommodating sub-assembly received in said valve accommodating bore, a first end of said valve sub-assembly contacting said lower step and a second end of said sub-assembly contacting said upper step, said sub-assembly having two separated medium passages defined between said first and second ends, said first medium passage having a stepped bore retaining said first valve closure member and said second medium passage associated with said second valve closure member, wherein an opening of said first medium passage overlaps said lower step so as to prevent the first valve closure member from falling out of said first medium passage.

2. A valve arrangement as recited in claim 1, wherein said lower step of said of said valve accommodating bore defines a pressurized medium source opening, said second medium passage lying on the axis of rotation of said source opening and adapted to receive pressurized medium from said source opening, said first medium passage arranged eccentrically from, but generally coplanar to said second medium passage.

3. A valve arrangement as recited in claim 2, wherein said sub-assembly comprises a single valve accommodating body.

4. A valve arrangement as recited in claim 2, wherein said sub-assembly frictionally engages said upper step by means of caulking.

5. A valve arrangement as recited in claim 2, wherein said sub-assembly comprises two valve accommodating bodies.

6. A valve arrangement as recited in claim 2, wherein said first and second medium passages include conical valve seat surfaces adapted to be abutted by said valve closure members.

7. A valve arrangement as recited in claim 1, wherein said first closure member is a hydraulically operable ball-type non-return valve and said second closure member is electromagnetically operable.

8. A valve arrangement as recited in claim 1, wherein said first valve closure member prevents hydraulic communication between a slip-controlled wheel brake, acting as a pressure medium consumer, and a braking pressure generator, acting as a pressure medium source, in the direction of the brake.

* * * * *